Patented July 28, 1925.

1,547,582

UNITED STATES PATENT OFFICE.

EDWIN R. HARDING, OF PITTSBURGH, PENNSYLVANIA, ASSIGNOR TO H. J. HEINZ COMPANY, OF PITTSBURGH, PENNSYLVANIA, A CORPORATION OF PENNSYLVANIA.

METHOD OF PREPARING FOOD.

No Drawing. Application filed January 3, 1925. Serial No. 380.

*To all whom it may concern:*

Be it known that I, EDWIN R. HARDING, residing at Pittsburgh, in the county of Allegheny and State of Pennsylvania, a citizen of the United States, have invented or discovered certain new and useful Improvements in Methods of Preparing Food, of which improvements the following is a specification.

My invention relates to improvements in the preparation of food products, and specifically of cereal food products.

In the cooking of cereals, and this is notably true of barley, rice, and oats, a gummy mass is produced, which is objectionable on several accounts: such a gummy mass, served on the table, is unpleasant in the mouth. If the mass be dried or baked, a hard product results, which taken into the mouth becomes superficially slimy and unpleasant. Again, in the production of flaked cereals, the gumming together alluded to occurs in the initial cooking and results in the loss of identity of the individual kernels of grain; the mass when dried has to be broken into fragments, preparatory to flaking, and these fragments approximating the original grains in size, are not (as are the original kernels) uniform in size. Furthermore, drying and fragmenting are slow and difficult operations.

My invention consists in adding to cereals as an incident to cooking, cellulose in finely divided condition. The presence of the so-added cellulose insures the preservation of the identity of the individual kernels, and whether the cooked product be served immediately on the table or be subjected to further treatment in preparation for service on the table, its condition is improved. Adhesion between the kernels is diminished or prevented, and in the one case unpleasantness of feel, in the mouth of the eater is prevented, and in the other, easy fragmentation into the original kernels is insured.

The cellulose which I preferably employ is that which is described in United States Letters Patent No. 1,495,789, granted May 27, 1924, on the application of William A. Hamor, jointly with myself, and is substantially pure cellulose, derived in finely divided condition by chemical treatment of such vegetable sources as corn-cobs, cotton, cotton linters, and wood pulp. Cellulose so prepared is insoluble and tasteless, bland and soft. Its effect on boiled cereal, eaten hot, as well as on other preparations of cooked cereal, is primarily mechanical, preventing the formation of gummy masses or hard masses. It has no appreciable effect to change the flavor of cooked cereals, and when used in the course of manufacture of prepared breakfast foods, it accomplishes the ends indicated, without appreciable modification in taste.

I am not, however, limited in the practice of my invention to cellulose so derived, and may employ cellulose derived from any source, subject to this limitation only: in order to be efficacious, to achieve my invention, it must be substantially free of starch or other substances which become gluey or gelatinous on cooking. Bran, therefore, as hitherto used in diluting cereal foods (in that it contains, besides cellulose, considerable starch), will not do; if bran is to be used in the practice of my invention, as a material rich in cellulose, it must be prepared for such use by the removal of its starch content. This may, of course, be done, by processes known to the art.

The addition of cellulose to cereal foods as herein described, not only accomplishes the ends immediately in view and set forth above; it is valuable therapeutically, as explained in the Hamor and Harding patent mentioned above, in that it affords a food of laxative tendency.

I shall particularly describe my invention in the practical application which I have made of it, namely, in the preparation of flaked rice.

The rice employed may be of such quality as is desired, brown or polished. I measure cellulose in quantity amounting to about ten per cent by weight of the quantity of rice to be prepared. I bring the cellulose into suspension in water, add rice to this suspension, mix thoroughly and cook. I follow the usual practice of preparing the cooked cereal for flaking; that is to say, I dry it incompletely, and then separate it into fragments. Separation occurs before and during drying. This separation into fragments may conveniently be accomplished within a cylindrical container rotating on a horizontal axis, and provided interiorly with longitudinal ribs or ledges. Within this cylinder the mass of cooked and incompletely dried rice is tumbled and broken up. Flaking and toasting operations follow, differing in no respect from those operations as they now are performed upon other grains.

The presence of cellulose is of great value, in the preparation of the product. Without cellulose the kernels become pasty or the surface and adhere together in large lumps. In the form of these aggregates the material dries slowly, and when dry has to be broken apart by crushing. During tempering the kernels or granules again stick together, and have to be worked apart before feeding to the rolls for flaking. A great deal of hand manipulation or special machinery is required to get the batches in shape for flaking, and it would be expensive and practically impossible to dry and temper the material in large batches on commercial scale. With cellulose present, the cooked material, if it has the right moisture content, can be broken up easily and the individual kernels stay separated during drying and tempering. Without cellulose, rice flakes, after becoming thoroughly moistened in the mouth, become gummy, and have a slightly slimy taste which is not noticeable when the product contains cellulose.

Incidentally to the operation described, and specifically in the initial cooking step, I may add seasoning, flavoring material, and other nutritive substances, such, for example, as vitamins and mineral salt concentrates; but these additions have no necessary or intrinsic relation to the practice of my invention, which may be achieved without them.

I have described the invention in its application to the production of flaked rice; similarly it may be applied, and with like effect, in the preparation of other grain in flaked form. And as has already been explained, its use in the cooking of grain,— the initial step in producing a flaked product,—gives a cooked product which without further treatment is a food ready to be eaten and free of gumminess. Furthermore, if the cooked rice be dried or baked to hardness, the presence of the cellulose ingredient insures ready crumbling in the mouth, instead of a resisting lump of superficially slimy substance.

I claim as my invention:

1. The method herein described of preparing a flaked cereal which consists in cooking with the grain finely divided cellulose, then separating the mass into the original kernels and drying it and flaking the kernels.

2. The method herein described of preparing a food product which consists in cooking grain in association with finely divided starchless cellulose.

3. The method herein described of preparing a food product which consists in mixing together rice and finely divided cellulose and cooking the mixture.

4. The method herein described of preparing a food product which consists in cooking rice in association with a finely divided edible material rich in cellulose and substantially free from substances which on cooking become adhesive.

In testimony whereof I have hereunto set my hand.

EDWIN R. HARDING.

Witnesses:
MARY A. WALL.
PERCY A. ENGLISH.